J. ROSS.
Stop-Valves.
No. 151,437.
Patented May 26, 1874.
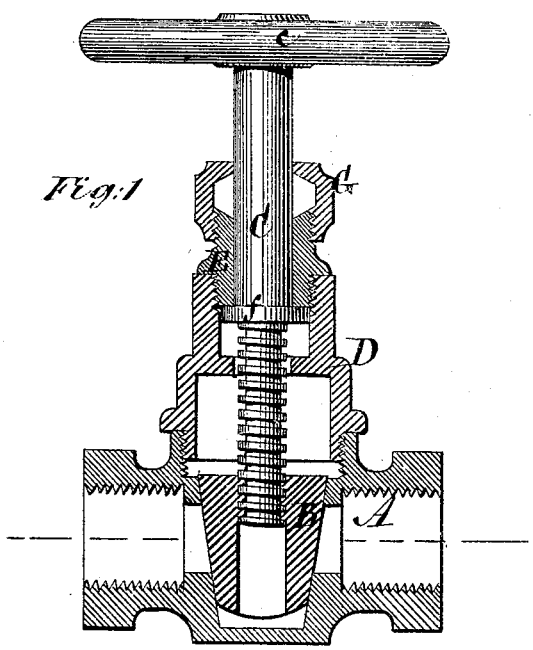
Fig. 1
Fig. 2
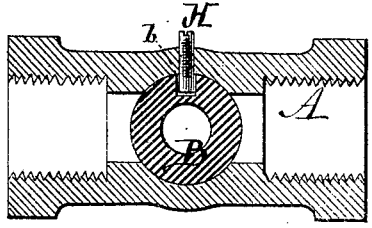
Witnesses:
Michael Ryan
Fred Hames
James Ross
by his Attorneys
Brown & Allen

UNITED STATES PATENT OFFICE.

JAMES ROSS, OF BOSTON, MASSACHUSETTS, ASSIGNOR TO DANIEL LEE, OF SAME PLACE.

IMPROVEMENT IN STOP-VALVES.

Specification forming part of Letters Patent No. 151,437, dated May 26, 1874; application filed April 29, 1874.

*To all whom it may concern:*

Be it known that I, JAMES ROSS, of Boston, in the county of Suffolk and State of Massachusetts, have invented an Improved Stop-Valve, of which the following is a specification:

My invention relates to certain improvements whereby the plug may be readily ground to correspond with its seat, and whereby it may be keyed in the seat to prevent it from turning when the valve is being opened or closed. The invention consists in a conical plug working in a conical seat in the shell of the valve, in combination with a removable screw in the shell engaging with a groove in the plug, whereby the plug is prevented from turning while the valve is being opened or closed, but provision is afforded for the turning of the valve for grinding it in its seat.

In the accompanying drawing, Figure 1 is a central vertical section of a valve embodying my improvement. Fig. 2 is a horizontal section of the same.

A represents the body or shell of the valve, of any suitable construction, formed with a seat for the plug B, which is tapering in form, and has an internal left-hand screw-thread formed in it for engagement with a corresponding thread on the valve-stem C, which passes through a cap, D, stuffing-box E, and nut G, and is provided with a hand-wheel, $c$, at its upper end, and a collar, $f$, about midway of its length. These parts are similar in form and construction to those in common use. On one side of the plug B is a groove, $b$, with which engages a removable pin or screw, H, passing through the shell A into the valve-seat.

When the plug is to be ground to its seat the screw H is removed, so that the plug is free to turn. When sufficiently ground and fitted the screw is inserted so as to engage with the groove and prevent the plug from turning.

When the valve is to be opened the valve-stem C is turned toward the left hand, and the engagement of the left-hand thread on the stem and plug causes said plug to rise without turning. By reversing the motion of the stem C the valve is closed.

I do not claim, broadly, a conical plug working in a conical seat, with provision to prevent it from turning therein, and provided with a screw-threaded stem.

What I claim as new, and desire to secure by Letters Patent, is—

The combination of the grooved conical plug B, the shell A, having a conical seat for the same, the valve-stem C, fitted with a screw-thread to the said plug, and the removable pin or screw H, screwing through the shell and entering the groove in the plug, all substantially as and for the purpose shown and described.

JAMES ROSS.

Witnesses:
JABEZ A. SAWYER,
FRANK P. ABBOTT.